United States Patent

[11] 3,630,571

| [72] | Inventor | David G. Saldana<br>15237 Lakeside St., Sylmar, Calif. 91342 |
|---|---|---|
| [21] | Appl. No. | 658,670 |
| [22] | Filed | Aug. 7, 1967 |
| [45] | Patented | Dec. 28, 1971 |

[54] AUXILIARY DUMPING APPARATUS FOR A VEHICLE
11 Claims, 12 Drawing Figs.

[52] U.S. Cl. .................................................. 298/14, 291/1
[51] Int. Cl. ........................................... B60p 1/30, B65g 67/32, B60p 1/00
[50] Field of Search ............................................. 298/12, 14, 15, 16

[56] References Cited
UNITED STATES PATENTS

| 2,370,489 | 2/1945 | Reed .......................... | 298/14 |
| 192,892 | 7/1877 | Bateman ...................... | 298/12 |
| 711,539 | 10/1902 | Shope.......................... | 298/14 |
| 2,534,156 | 12/1950 | Wyatt........................... | 298/12 UX |
| 2,684,864 | 7/1954 | Anthony....................... | 298/1 ADB UX |
| 3,055,709 | 9/1962 | Kirkwood..................... | 298/1 ADB UX |
| 3,147,999 | 9/1964 | Daniels......................... | 298/1 ADB UX |

FOREIGN PATENTS

| 275,173 | 6/1927 | Australia ...................... | 298/12 |
| 423,638 | 4/1911 | France ......................... | 298/14 |

Primary Examiner—Richard J. Johnson

ABSTRACT: The specification discloses a dumping apparatus adapted to be mounted in or on the body of a vehicle, such as a pickup truck, station wagon, or the like, and includes a chamber-defining container structure adapted to be slidably mounted on a container mounting and supporting frame, rail, or track means which is adapted to be fixedly mounted in a substantially horizontal manner with respect to a body portion of a vehicle. For example, the frame means may be mounted on the bed of a pickup truck or on the floor of a station wagon or the like. The container structure is slidably mounted with respect to the frame or rail means referred to above for movement between a forwardly extreme load-receiving and load-carrying position and a rearwardly extreme preload-dumping position where a substantial portion of (usually slightly more than one-half of) the container structure extends beyond the rear end of the frame.

INVENTOR.
DAVID G. SALDANA

INVENTOR.
DAVID G. SALDANA

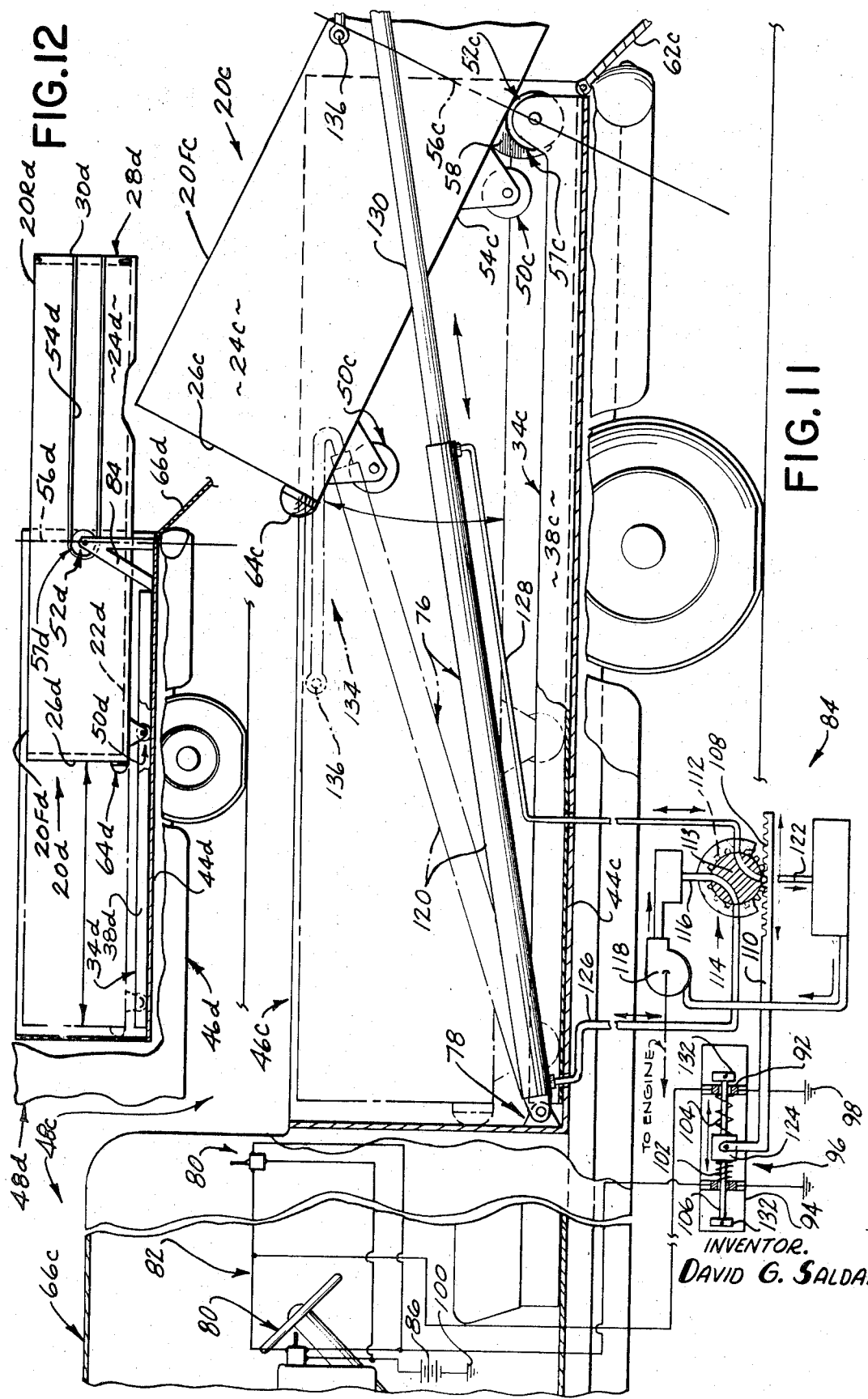

3,630,571

AUXILIARY DUMPING APPARATUS FOR A VEHICLE

Generally speaking, the apparatus of the present invention pertains to the vehicle art and, more particularly, to a vehicle and to a dumping apparatus therefor capable of normally receiving and carrying a load in an effective fully retained manner but, upon operation in a dumping manner, to effectively dump the load at a selected location and to do so in a very simple and easily performed manner which may be accomplished manually or by the operation of powered actuator means, or the like.

Additionally, in several preferred forms of the invention where the dumping operation is manually performed, automatic return means may be provided for causing the container structure to angularly rotate back into its normal horizontal position after completion of a dumping operation. The apparatus is of extremely simple construction and provides an automatic stop at the rear end of the travel of the container structure so that the container structure cannot become accidentally disengaged from a container mounting and supporting frame or rail means which can be easily mounted on and attached to the bed of a truck, on the floor of a station wagon, or at any other convenient location on a motor vehicle or other vehicle.

In other words, the apparatus of the present invention provides, with an absolute minimum of structure, for the ultimate in simplicity of dumping operation of a container structure which is of a type which can be supplied as original equipment on a motor vehicle at the time of original manufacture thereof, or which can be supplied as an auxiliary and completely separate kit which can be easily and simply mounted on a preexisting motor vehicle at any time.

With the above points in mind, it is an object of the present invention to provide a novel dumping apparatus having any or all of the advantages referred to herein and including any or all of the features referred to herein, generically and/or specifically, and individually or in combination, and which is of extremely simple, inexpensive construction suitable for manufacture as original equipment on a vehicle or for independent manufacture as a separate item adapted for ready mounting on a preexisting vehicle, whereby to be conducive to widespread use of the apparatus of the present invention, for the purposes of the present invention as outlined herein and for any other substantially equivalent purposes.

Further objects are implicit in the detailed description which follows hereinafter (which is to be considered as exemplary of, but not specifically limiting, the present invention), and said objects will be apparent to persons skilled in the art after a careful study of the detailed description which follows hereinafter, and all such implicit objects are intended to be included and comprehended herein as fully as if particularly defined and pointed out herein.

For the purpose of clarifying the nature of the present invention, several exemplary embodiments of the invention are illustrated in the hereinbelow-described figures of the accompanying drawings and are described in detail hereinafter.

FIG. 1 is a greatly reduced-size, fragmentary, partly broken away side view, partly in elevation and partly in vertical section, taken substantially along the offset planes indicated by the arrows 1—1 of FIG. 2, and shows the container structure in its forwardly extreme, normal, load-receiving and load-carrying position within the rear portion of the pickup truck, resting on the bed thereof, and with the tail gate of the pickup truck shown in closed relationship.

Figure 1:
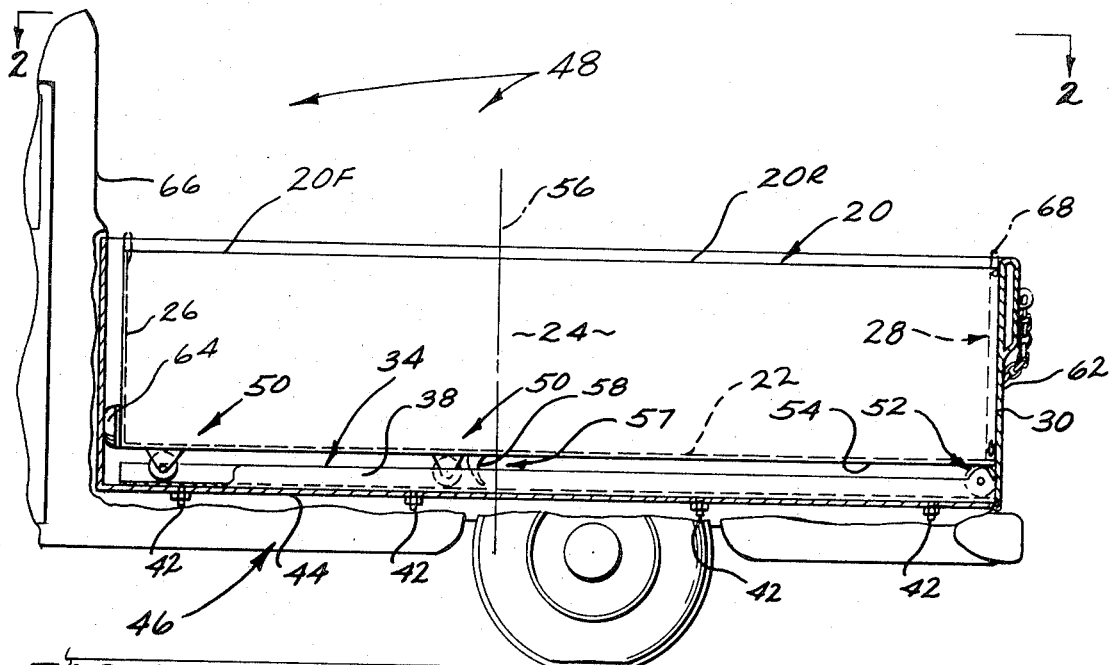
Figure 4:
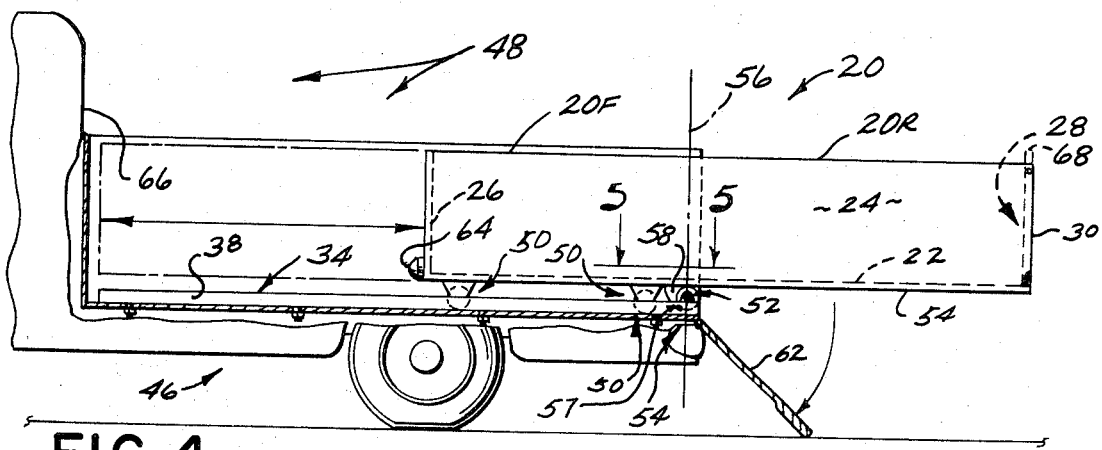
Figure 6:
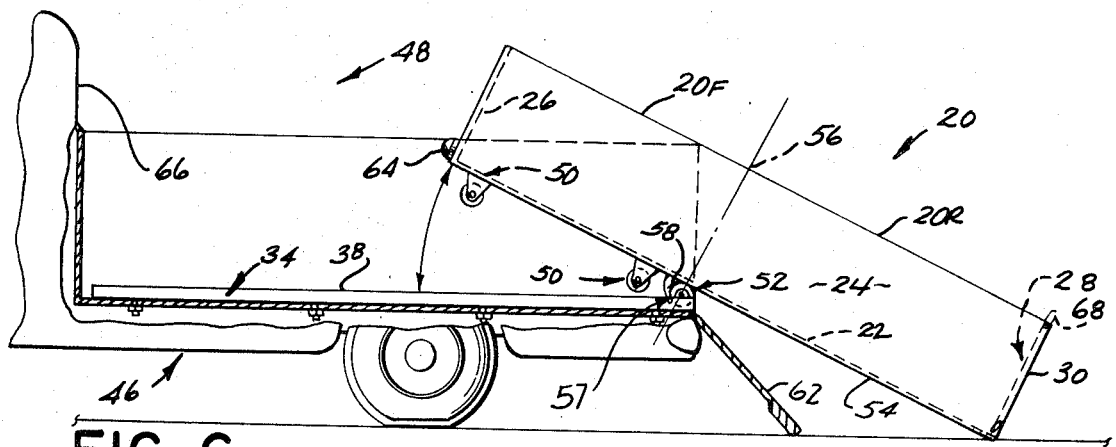

FIG. 4 is a side view similar in many respects to FIG. 1, although drawn to a smaller scale, but shows the apparatus after the container structure has been rearwardly moved to an extreme rearward position, which may be called a preload-dumping position, and with the container structure still being horizontally directed and not yet having tipped downwardly in a clockwise direction into a gravity-load-discharging position such as is shown in FIG. 6.

Figure 5:
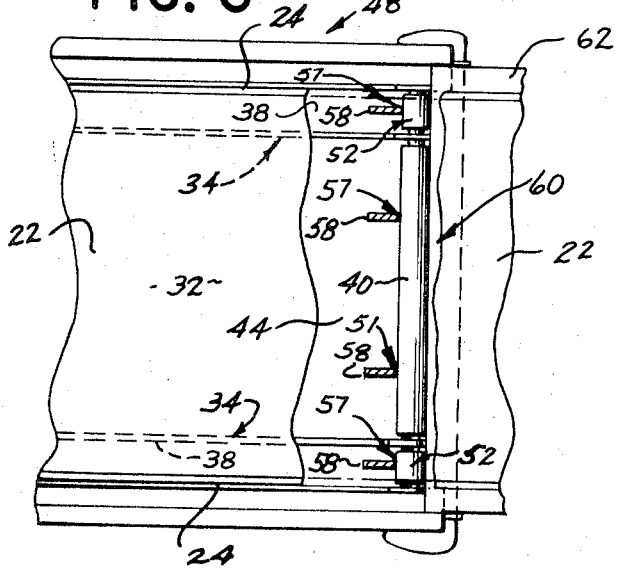

FIG. 5 is an enlarged, fragmentary view, partly comprising a top plan view and being partly in section, taken substantially along the plane indicated by the arrows 5—5 of FIG. 4 and with certain portions of the apparatus below the plane of the view being broken away at different lateral positions so that various planes of the apparatus can be seen in FIG. 5. This is for the purpose of providing a maximum disclosure of the various portions of the apparatus when in the horizontally extended preload-dumping position preliminary to the downward tipping of the container structure into a gravity-load-discharging position as shown in FIGS. 6 and 7.

FIG. 6 is a view similar to FIG. 4, but shows the next step in the normal operation of the dumping apparatus which comprises its downward tipping movement from its rearwardly extended but horizontal preload-dumping position shown in FIG. 4 into the rightwardly downwardly angularly inclined, gravity-load-discharging position clearly shown in FIG. 6.

Figure 7:
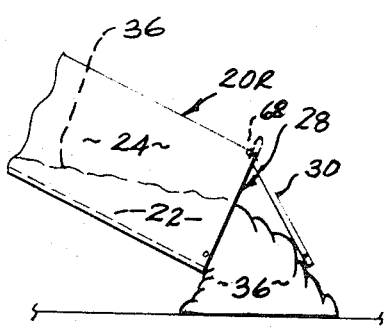

FIG. 7 is a fragmentary view of the right end of the container structure portion of the apparatus in the gravity-load-discharging position of FIG. 6, and shows it with the rear closure door or gate member of the exemplary first form of container structure in open relationship so as to allow a load of material carried within the container structure to be discharged through the open rear load-discharging end of the container structure.

Figure 8:
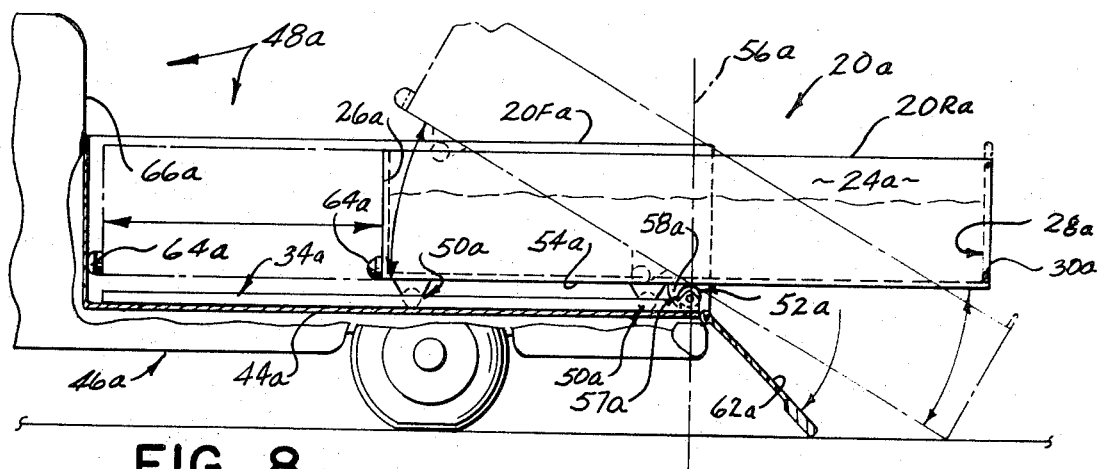

FIG. 8 is a view very similar to both FIG. 4 and FIG. 6, although it illustrates a modified form of the container structure, in that the modified container structure is shown in solid lines in a position similar to the preload-dumping position of the container structure of FIG. 4 and in that the container structure of FIG. 8 is shown in phantom in a gravity-load-discharging position similar to that of the container structure shown in FIG. 6 of the first form of the invention. However, it should be clearly noted that, in this modification, the rear portion of the container structure beyond the effective pivot point around which it pivots into the downwardly rightwardly inclined, gravity-load-discharging position illustrated in phantom in FIG. 8, is substantially at a balance point of the entire container structure whereby to facilitate manually pivoting the container structure around the effective pivot point both initially downwardly when loaded and subsequently upwardly after the load has been discharged. In other words, manual performance of the tipping operation is facilitated in this form of the invention by reason of a substantially balanced condition of the container structure with respect to its effective pivot point.

Figure 9:
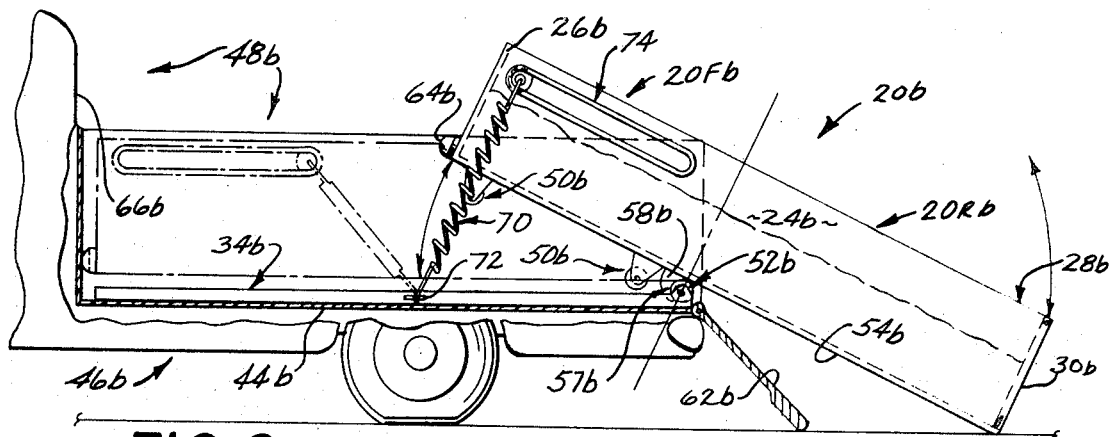

FIG. 9 is a view similar to FIG. 6 of the first form of the invention, but illustrates a modification thereof wherein the overbalanced condition of the loaded container structure when it is moved to a rearwardly extreme, preload-dumping position similar to that shown in FIG. 4 of the first form of the invention still exists and is such as to cause automatic downward effectively clockwise tipping movement of the loaded container structure into the rightwardly downwardly inclined gravity-load-discharging position shown in FIG. 9, but in this modification of the invention, after the load is discharged it is not necessary to manually forcibly return the container structure to its rearwardly extreme but upper horizontal position as shown in FIG. 4 of the first form of the invention—this being accomplished automatically by return biasing spring means which exerts sufficient force to cause return movement of the container structure after completion of a load-dumping and discharging operation, but which does not exert sufficient force to prevent the automatic movement of the rearwardly extended container structure, when in a position similar to that of FIG. 4, into the downwardly inclined gravity-load-discharging position shown in FIG. 9.

Figure 10:
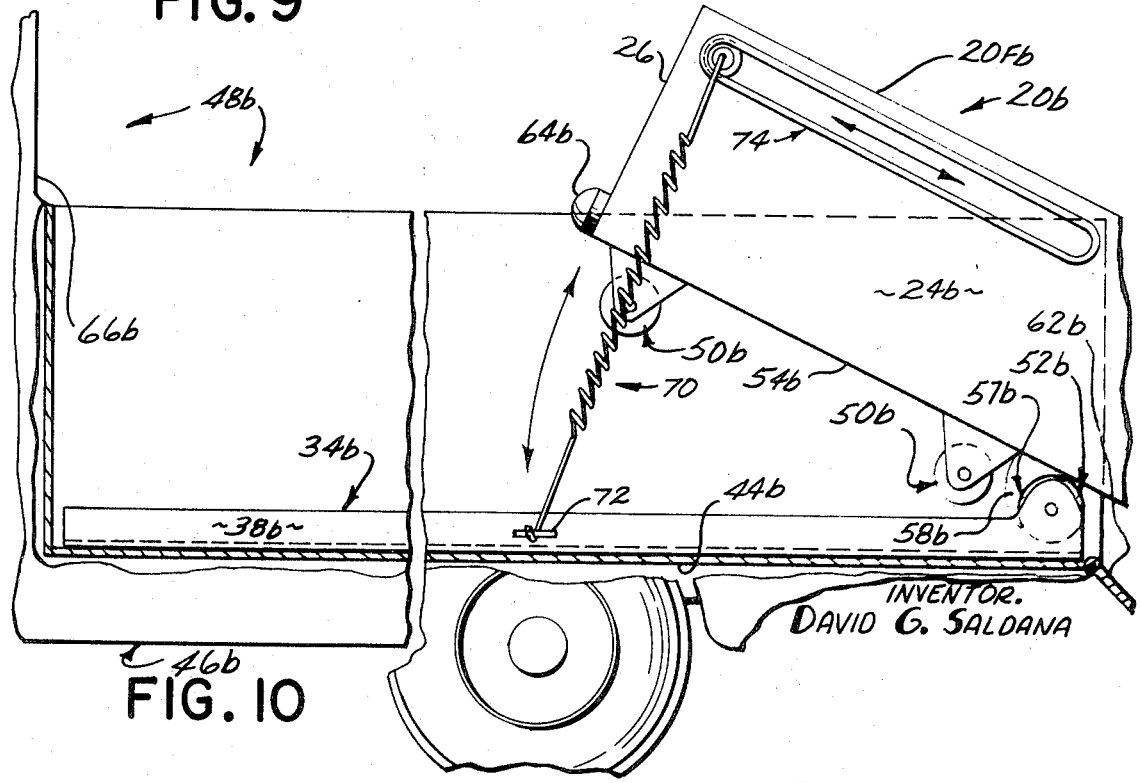

FIG. 10 is an enlarged, fragmentary view, partly broken away and partly in section, and better illustrates the structure of the apparatus shown largely in side elevation in FIG. 9.

FIG. 11 is an enlarged, fragmentary, partially broken away side view, generally similar to the first form of the invention shown in FIGS. 1-7, but provided with a controllably operable powered actuator means for moving the fragmentarily shown container structure between the three positions thereof comprising a normal forward position similar to that shown in FIG. 1 of the first form of the invention, a rearwardly extreme but still horizontal position similar to that shown in FIG. 4 of the first form of the invention, and a downwardly inclined, rearwardly extreme load-dumping position similar to that shown in FIG. 6 of the first form of the invention, and vice versa.

FIG. 12 is a fragmentary side view, partly in elevation and partly in section, similar in many respects to FIG. 1 of the first form of the invention, but illustrates a slight modification thereof.

Generally speaking, a first exemplary form of the present invention comprises a hollow chamber-defining container structure, one exemplary form of which is generally designated by the reference numeral 20, which is shown as being of substantially parallelopiped shape such as to be rectangular as seen in side elevation, rectangular as seen in end elevation, and rectangular as seen in top plan view. Also, in the exemplary first form of the invention illustrated, the container structure 20 is upwardly open and has a transverse bottom wall 22, a pair of substantially parallel, longitudinally directed, laterally spaced, upstanding sidewalls 24 carried by side edges of the bottom wall 22, and a forwardly positioned, transversely directed, upstanding front wall 26 carried by a forward edge of the bottom wall 22 and connecting forward edges of the pair of sidewalls 24.

In the exemplary first form of the invention illustrated, the container structure 20 has an open rear load-discharging end 28 which is shown as being provided with a closure door or tailgate 30 adapted to effectively close same when desired and to controllably swing open (in the example illustrated, at the bottom) when a load is to be discharged through the downwardly tilted and inclined open rear load-discharging end 28. However, the invention is not limited to the type of closure tailgate 30 illustrated in the first form of the invention, but may be provided with any type of rear end closure or tailgate and, in certain forms of the invention, the tailgate or rear end closure may be eliminated entirely if desired, although the provision of such a closure gate or tailgate is preferred in order to allow the hollow interior or chamber 32 defined within the container structure 20 to carry a maximum load without inadvertently losing a small portion thereof through the open rear end 28.

Figure 2:
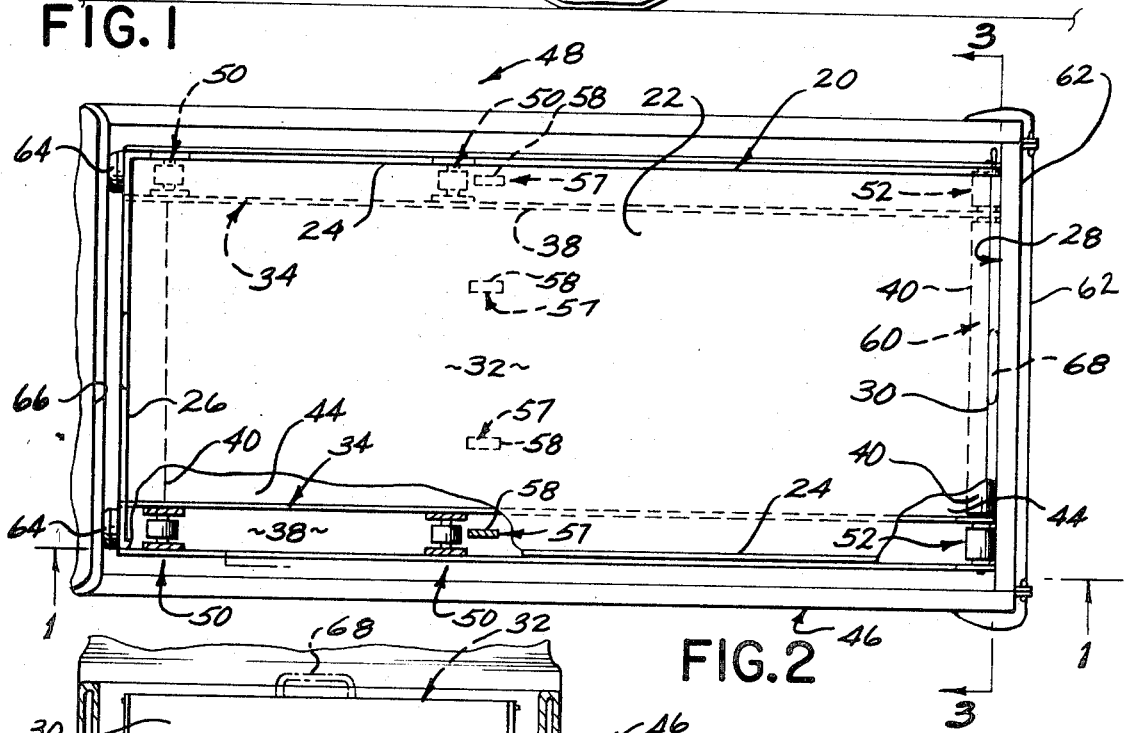
FIG. 2 is a top view taken substantially in the direction of the arrows 2—2 of FIG. 1, although certain corner portions of the apparatus are shown partially broken away so that the lower parts of the apparatus underlying the container structure can be seen in FIG. 2.
Figure 3:
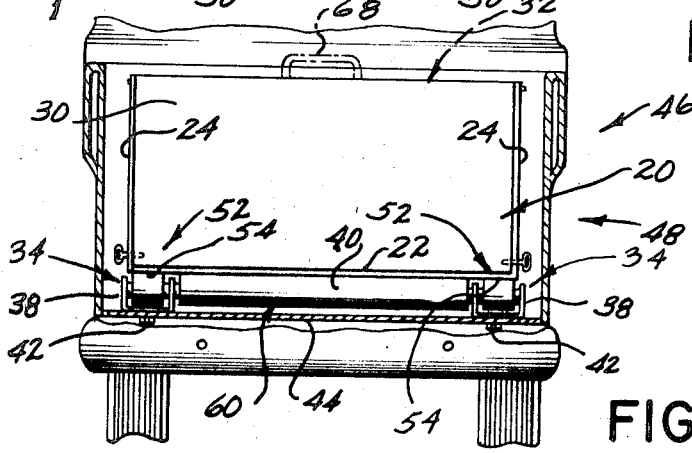
FIG. 3 is a fragmentary, partially broken away view, partly in elevation and partly in section, substantially along the plane indicated by the arrows 3—3 of FIG. 2.

The exemplary first form of the invention is also provided with a container-mounting and container-supporting frame means which may take the form of rail means or track means, one form of which is generally designated by the reference numeral 34 in the first form of the invention, which is adapted to be fixedly mounted in a substantially horizontally directed plane with respect to a body portion of a vehicle in a manner such as to mount the container 20 for movement between a forwardly extreme, normal, load-receiving and load-carrying position substantially centered over the frame 34, as shown in FIGS. 1-3, and a rearwardly extreme, rearwardly horizontally projecting, preload-dumping position where the rear portion of the container structure 20 extends rearwardly beyond a rear end of the frame means 34 and is effectively unsupported whereby to bring about a rearwardly and downwardly tipping movement of the container structure 20 from the rearwardly extreme preload-dumping position shown in FIG. 4 into a downwardly inclined load-dumping or lower extreme, gravity-load-discharging position as shown in FIG. 6 for automatically causing the open rear discharging end 28 of the container 20 (assuming that the closure door or tail gate 30 is open as shown in FIG. 7) to discharge a load, such as that shown fragmentarily at 36, through the open rear discharging end 28 of the container 20 under the action of gravity, as is best shown in FIG. 7.

The details of the slidable mounting of the container structure 20 on the frame means 34 for movement between the three extreme positions referred to in the preceding paragraph will be described in greater detail hereinafter.

In the exemplary first form of the invention, the hereinbefore-mentioned frame means, indicated generally at 34, takes the form of a pair of longitudinal, upwardly open, substantially U-shaped channel members 38 connected by cross frame or transversely directed structural members 40 whereby to provide a rigid boxlike frame 34, as is best shown in top plan view in broken lines in FIG. 2.

The entire frame 34 is adapted to be fastened in a substantially horizontal plane as previously mentioned and, in the exemplary first form of the invention illustrated, this is shown as being accomplished by fastening it with suitable fastening means 42 to the top surface of the horizontal bed portion 44 of the rear truck body portion, indicated generally at 46, of a pickup truck, indicated generally at 48. However, it should be noted that the frame 34 may be similarly fastened on the flat floor portion inside of the body of a station wagon or in any other substantially horizontal position with respect to a body portion of a vehicle so as to be capable of receiving and mounting the container structure 20 thereover for movement between the three extreme positions described hereinbefore.

The container structure 20, in the exemplary first form of the invention illustrated in FIGS. 1-7, is provided at a forward location with transversely spaced, downwardly directed, rollable wheel means adapted to be normally rollably received by, and to cooperate with, the longitudinal frame means 34. In the particular type of longitudinal frame means 34 illustrated in the first form of the invention, it is the upwardly open, substantially U-shaped, parallel channel members 38 which are adapted to receive the rollable wheel means, generally designated by the reference numeral 50, and which, in said first form of the invention, are carried underneath similar side portions of the forward portion of the container structure 20 and are adapted to roll along the longitudinal channel members 38 between the normal, forwardly extreme position thereof when the entire container structure 20 is in the previously mentioned forwardly extreme, normal, load-receiving and load-carrying position, as shown in FIGS. 1-3, and the previously mentioned rearwardly extreme, preload-dumping position shown in FIGS. 4 and 5, where a rear portion 20R of the container structure extends completely beyond the rear end of the longitudinal frame means 34 and is effectively unsupported thereby whereby to bring about downward tipping movement thereof into the angularly inclined load-dumping position best shown in FIG. 6.

In the exemplary first form of the invention illustrated, a rear end portion (or plurality of portions) of said longitudinally directed, laterally spaced frame means 34 is provided with upwardly directed roller means, such as generally designated by the reference numeral 52, positioned for rollable cooperation with respect to corresponding roller-riding, load-supporting portions of the container structure 20.

In the exemplary first form of the invention illustrated, said roller means 52 comprises two laterally spaced rollers positioned for rotation about the same transversely extended, horizontal axis perpendicular to the longitudinal direction of each of the upwardly open, U-shaped channel members 38 and lying at the rear ends thereof on each side of the rear cross frame member 40, which, incidentally, has sufficient clearance to avoid being engaged by the container structure 20 as it moves along the frame means 34.

Also, in the exemplary first form of the invention illustrated, the above-mentioned roller-riding, load-supporting portions of the container structure 20 actually comprise side edge bottom surface portions 54 of the container structure 20 extending along similar side edge parts of the bottom wall 22 of the container structure 20 from the open rear end 28 thereof to a forward location just forward of the longitudinal center of the container structure, so that the rear portion of the container structure, which is arbitrarily shown as comprising that portion lying to the right of the broken line 56 in FIG. 1 and designated by the reference numeral 20R, is longer than the forward portion of the container structure lying to the left of the arbitrary division line 56 and designated by the reference numeral 20F.

In fact, in the first form of the invention, as best shown in FIG. 1, the overall container structure 20 may be approximately 8 feet long so as to be capable of cooperation with a standard pickup truck bed 44 and, in this example, the rear container portion 20R to the right of the arbitrary division line 56 may be approximately 4 ½ feet long, while the front container portion 20F may be approximately 3½ feet long. This arrangement obviously provides a slightly overbalanced condition of the container structure 20 when in the rearwardly extreme, preload-dumping position best shown in FIG. 4 which of course, means that as soon as said container structure 20 is slidably moved rearwardly into said rearwardly extreme, preload-dumping position as shown in FIG. 4, it will automatically tilt angularly downwardly into the load-dumping or lower extreme, gravity-load-discharging position, best shown in FIG. 6, for discharging the load shown fragmentarily at 36 and previously carried within the container structure 20 through the open rear load-discharging end 28.

In order to prevent the entire container structure 20 from sliding downwardly and angularly toward the right and possibly becoming completely disengaged from the frame 34, stop means is effectively provided, one form of which is generally designated by the reference numeral 57 as best shown in FIGS. 4-6, and normally includes at least one portion carried by the movable container structure 20 and at least one other cooperating portion or element carried by a rear portion or part of the frame means 34 which acts to limit rearward travel when said two portions or elements come into abutment with each other when the container structure 20 is moved from its forwardly extreme position, as best shown in FIGS. 1-3, into its rearwardly extreme horizontal, preload-dumping position as best shown in FIG. 4.

In the exemplary first form of the invention illustrated, said stop means 57 takes the form of one or more curved abutment members 58 carried by a bottom portion of the container structure 20 in a downwardly and rearwardly extending position and also comprises the rear cross frame member 40, which may be said to now function as a fixed stop member, indicated generally at 60, lying between the rollers 52 and positioned such as to be engaged by the curved abutment member or members 58 when the container structure 20 is moved into the rearwardly extreme, preload-dumping position best shown in FIGS. 4-6. Thus, it will be seen that the stop means 57 positively prevents the container structure 20 from becoming disengaged from the frame means 34 and also prevents excessive rearward movement of the container structure 20 beyond the optimum position best shown in FIGS. 4-5 where the overbalanced relationship of the rear end portion 20R of the container structure 20 with respect to the front portion 20F thereof, is just such as to facilitate the downward tipping and load-discharging operation of the container structure 20 and yet does not provide enough overbalancing relationship of the empty container structure 20 after a load has been discharged through the open rear end 28 thereof to make it at all difficult to manually reverse the tipping movement of the now empty container structure 20 back into an upper, rearwardly extended position similar to that shown in FIG. 4, preparatory to slidably moving the container structure 20 forwardly into its normal, forwardly extreme, load-receiving and load-carrying position such as best shown in FIGS. 1-3.

It should be noted that various means may be provided for immobilizing or effectively locking the container structure 20 in its forward extreme position so that when loaded and when no discharging operation is intended at a particular time, there will be no tendency for the container structure 20 to move rearwardly in an undesirable manner when the truck 48 is traveling. While various locking means may be employed within the broad scope of the present invention, the one employed in the exemplary first form of the invention comprises the tailgate 62 of the pickup truck body 46 which is pivoted to the rear end of the bottom or bed 44 thereof and which, when opened in the manner shown in FIGS. 4 and 5, allows the container rearward sliding movement, downward tipping movement, and load-discharging operations described hereinbefore, and the reversal thereof, but which, when upwardly moved into closed and locked relationship as is best shown in FIGS. 1 and 2, provides a positive locking or rearward movement stopping abutment member in contact with the rear end 28 and/or the rear closure member 30 normally thereover, of the container structure 20, so that it will be prevented from rearward movement.

If desired, to prevent any forward movement, the forward end wall 26 of the container 20 (or the U-shaped channel members 38) may be provided with stop or bumper members 64 (preferably of compressible, shock absorbing and nonmarring material), or the abutment of the forward wall 26 of the container structure 20 with the forward end of the pickup truck body 46 immediately adjacent to the rear wall of the cab 66 thereof, may act as a forward movement stopping or abutment means, thus effectively locking the container structure 20 at both ends against undesired longitudinal movement when such is not desired. This effective immobilization of the container structure 20 may be further enhanced by providing a positive locking means on the rollers 50 for locking same with respect to the U-shaped channel members 38, if desired, or any other functionally equivalent structure may be employed within the broad scope of the present invention.

The open rear load-discharging end 28 of the container structure 20 may be provided with operating handle means such as indicated in phantom at 68, if desired, for facilitating the manual movement of the container structure 20 from the rearwardly extreme but horizontal, preload-dumping position shown in FIG. 4 into the lowermost, inclined, gravity discharging position best shown in FIG. 6, and vice versa.

FIG. 8 illustrates fragmentarily a very slight modification of the invention wherein similar parts are designated by similar reference numerals, followed by the letter "a," however. In this modification, it will be noted that the rear portion 20Ra of the container structure 20a is of very nearly the same length as the front container portion 20Fa and is so arranged that when the container structure 20a is in the rearwardly extreme, horizontal, preload-dumping position, shown in solid lines in FIG. 8, and is either unloaded or is evenly loaded along the length thereof with substantially homogeneous load material, the container structure 20a is very nearly balanced about the pivot points provided by the pair of upwardly directed roller means 52a, thus requiring a minimum of manual force for tipping the rear end 28a of the container structure 20a into its downwardly extreme position, shown in phantom in FIG. 8, for gravity discharging of a load and for returning it to its upper normal position after such a load-discharging operation is completed.

FIGS. 9 and 10 illustrate a further modification of the invention generally similar to the first form of the invention, with certain minor changes, and, therefore, similar parts are designated by similar reference numerals, followed by the letter "b," however. In this modification, it will be noted that the unbalanced condition of the longer rear portion 20Rb with respect to the shorter front portion 20Fb of the container means 20b taught in the first form of the invention is again employed so that automatic downward tipping movement of the rearwardly horizontally extended container structure 20b will occur for automatic gravity discharging of a load. However, in this modification, it is not then necessary to manually lift the now empty and downwardly tipped rear end 20Rb of the container structure 20b upwardly into its previous horizontally extended position preliminary to slidably rolling the entire container structure 20b forwardly into its normal, forwardly extreme, load-receiving and load-carrying position similar to that shown in FIGS. 1-3 of the first form of the invention. In this modification, the now empty container structure 20b, automatically returns to its rearwardly extended horizontal position by reason of the provision of spring biased return means, such as generally designated at 70, positioned for effective cooperation with respect to a fixed location, such as indicated at 72, and a roller-retaining slideway, such as indicated at 74, of the container structure 20b, and is adapted to be temporarily overridden when the container structure 20b is in said rearwardly extreme but still horizontally extended and unbalanced position and is loaded, which will thus cause the rear end of the container structure 20b to tip into the downwardly extreme, angularly inclined, gravity-discharging position because of the large tipping moment provided by reason of the considerable unbalanced mass of the portion of the load in the longer rear portion 20Rb of the container structure than that present in the shorter front portion 20Fb of the container structure 20b. However, it will be understood that after the load is discharged and the angularly downwardly inclined container structure 20b becomes empty, the amount of tipping moment provided by the unbalanced, longer rear portion 20Rb is less than the return force provided by the spring biased return means 70 which will thus automatically return the container structure 20b into a horizontal position.

FIG. 11 illustrates a further modification of the invention and, therefore, similar parts are designated by similar reference numerals, followed by the letter "c," however. In this modification, the movement of the container structure 20c between the three extreme positions which have been previously referred to in connection with previously described forms of the invention, is no longer manually accomplished but is accomplished through the use of controllably operable actuator means, one form of which is generally designated by the reference numeral 76, and which is effectively pivotally coupled with respect to a fixed location, such as generally designated at 78, relative to the truck body 46c and is effectively coupled with respect to the container structure 20c in a manner such that upon controllable operation of the actuator means 76 in one manner which, in the example illustrated comprises an extension manner, the container structure 20c will be moved from its forwardly extreme position to its rearwardly extreme, preload-dumping horizontal position and then into its downwardly inclined load-discharging position in a manner controllable by the operation of control means, such as indicated diagrammatically at 80, and which may be present at a single or at multiple locations, one of which may be within the cab 66c of the truck 48c for convenient operation by a driver of the truck 48c while he is sitting in the cab 66c thereof. The provision of duplicate controls 80 at other locations will facilitate the power-driven dumping operation from other positions. It should also be noted that the controls 80 may then be operated to cause the actuator means 76 to operate in the opposite manner, which in the example illustrated comprises a retraction manner, which will reverse the above-described sequence of operations and will effectively return the container structure 20c to its normally forwardly extreme, load-receiving and load-carrying position.

The actuator means 76 may be provided with electrically energizable control circuit means such as is shown partially and in diagrammatic, schematic form at 82 in FIG. 11, and including the previously mentioned remote, manually operable control means 80 therefor positioned at one or more convenient operating locations.

A brief explanation of the operation of the exemplary but nonspecifically limiting complete control system, generally designated by the reference numeral 84 in FIG. 11, will now be set forth, but it should be specifically understood that it is exemplary only and is not to be construed as limiting the invention to the exact arrangement illustrated and described, since a variety of substantially functionally equivalent control systems may be employed in lieu thereof.

The control system 84 shown in FIG. 11 is arranged so that each of the control means 80 comprises electrical switch means connected in parallel with respect to the other control electrical switch means 80, with each being in series with the battery or other power supply 86 and having two parallel output leads 88 and 90 adapted to be selectively energized and connected in series to the corresponding two different solenoid coils 92 and 94 at opposite ends of the double-action control solenoid actuator means, generally designated by the reference numeral 96, and then being connected to ground at 98 so as to be connected to the ground terminal 100 of the battery or power supply 86 and thus be in circuit therewith.

The arrangement is such that each control switch 80, in the preferred form illustrated and described, has three positions, a first "off" position where neither of the solenoid coils 92 or 94 is energized, a second position where the right solenoid coil 92 is energized but the left solenoid coil 94 is not energized, and a third position where the left solenoid coil 94 is energized but the right solenoid coil 92 is not energized. This is true of any of multiple such control switches 80, because each is similarly connected in parallel with respect to the battery 86 and the solenoid coils 92 and 94.

The double-ended solenoid actuator 96 has a pair of centering springs 102 and 104, which normally tend to bias the armature-carrying common rod member 106 into a centered or neutral position such that the rack 108 carried by the operating arm 110 driven by the armature-carrying rod member 106, rotates the spur gear teeth 112 connected to the rotatable inner core portion 113 of the four-way valve means, generally designated by the reference numeral 114, from the main actuator extension position shown in FIG. 11 into a neutral position with the rotatable inner core portion 113 of the four-way valve means 114 rotatively angularly displaced substantially 45° in a counterclockwise direction from the main actuator extension position thereof shown in FIG. 11. This will, of course, completely disconnect the high pressure in the high-pressure duct 116 coming from the engine-driven pump 118 from either end of the cylinder portion 120 of the main actuator 76 and will similarly disconnect the low-pressure duct 122 from either end of said main actuator 120 so that it will be locked in whatever position it is in at the time, which is usually the extreme retracted position of the main actuator 76, with the container structure 20c in an extreme forward position such as that shown in phantom in FIG. 11. However, the main actuator means 76 can be so locked in any position, if desired.

When any of the control switches 80 is closed by movement to the second position referred to above, which energizes the solenoid coil 92 but not the solenoid coil 94, the right ferromagnetic armature or head member 132 is leftwardly attracted by the energized solenoid coil 92 and the nonmagnetic central abutment member 124 carried by the armature-carrying rod member 106 is forcibly moved toward the left against the action of the biasing spring 102 into a position such as is shown in FIG. 11, and this, of course, moves the connecting rod 110 and the rack 106 toward the left and rotates the four-wave valve-driving spur gear 112 clockwise from the neutral position described above into the main actuator extension position of the four-way valve means 114 shown in FIG. 11, which places high pressure in the duct 126 and low pressure in the duct 128, and thus causes the main actuator 76 to extend its connecting rod portion 130 outwardly to any desired extent corresponding to the positioning of the container structure 20c in either of the two previously mentioned rear positions thereof, comprising a rearwardly extreme but horizontal position similar to that shown in FIG. 4 and a rearwardly extreme, downwardly tipped gravity load-discharging position similar to that shown in FIG. 6.

The extension operation of the main actuator 76 can be stopped at any time by merely moving the control switch 80 back to the first or "off" position so that the solenoid coil 92 is deenergized, in addition to the already existing deenergized condition of the other solenoid coil 94. This will immediately allow the left centering spring 102 to extend and move the central nonmagnetic abutment member 124 to its normal centered position which rotates the core portion 113 of the four-way valve 114 substantially 45° in a counterclockwise direction from that shown in FIG. 11 and thus returns it to off position with neither high nor low pressure connected to either of the ducts 126 or 128 of the main actuator 76. This, of course, locks the main actuator 76 in that particular extended position.

Incidentally, in connection with the above, it should be noted that suitable stop means may be provided for causing energization of either solenoid coil 92 or 94 to produce the desired 45° rotation of the inner rotary core portion of the four-way valve means. This may merely be provided by the enlarged ferromagnetic armature heads 132 being at the right locations or by any other suitable travel-limiting means well known in the art and, therefore, not shown nor described in any additional detail.

After the dumping operation is completed, the driver of the truck or operator of the dumping apparatus then merely moves the control switch 80 into the third position referred to above, which energizes the solenoid coil 94 and does not energize the solenoid coil 92. This functions in substantially the same manner as (although oppositely directed from) that described above in connection with the energization of the solenoid coil 92 and causes the left ferromagnetic armature or head member 132 to be rightwardly attracted by the energized solenoid coil 94, which causes the connecting rod 110 and rack 108 to move toward the right and to, therefore, rotate the spur gear 112 and the core 113 of the four-way valve 114 in a counterclockwise direction 45° from its normal, neutral or off position, and actually 90° from the main actuator extension position shown in FIG. 11, which acts to connect high pressure to the duct 128 and low pressure to the duct 126 and, thus, cause effective retraction of the main actuator means 76, which will positively move the container structure 20c back from a position similar to that shown in FIG. 6 first into a position similar to that shown in FIG. 4 and then into a forwardly extreme position similar to that shown in FIG. 1, at which time the main control switch 80 may be moved to the first or off position previously referred to, which will completely deenergize the double-ended solenoid control actuator 96 and allow the four-way valve 114 to return to its normal, centered, completely closed, neutral position which, as previously mentioned, locks the actuator 76 in said retracted position. Incidentally, if desired, the inner core 113 of the four-way valve 114 may be provided with centering means (usually spring means) for causing it to return to, and normally remain in, off position when neither solenoid coil 92 nor 94 is energized.

The fitting 134 is provided for attaching the right end of the main actuator connecting rod 130 with respect to the sidewall 24c of the container structure 20c and its purpose is to provide a pivotal attachment point at the location 136 which is properly located with respect to the imaginary plane 56c to allow the container 20c to move between the three positions previously mentioned and yet to, at the same time, allow the cylinder portion 120 of the main actuator 76 to be sufficiently long to have a maximum stroke adequate for the forcible movement of the container means 20c between said three positions. However, various other functionally equivalent means may be employed in lieu of this specific arrangement.

FIG. 12 fragmentarily illustrates a slight modification of the invention, and similar parts are designated by similar reference numerals, followed by the letter "d," however. In this modification, it will be noted that the major change is the fact that the roller-riding load-supporting portions 54d do not lie along the bottom of the container structure 20c as in the first form of the invention, but, instead, comprise a pair of outwardly extending, downwardly facing, effectively grooved roller-receiving channel portions 54d carried by corresponding sidewall portions 24d of the container structure 20d and extending from the open rear end 28d thereof to a position just forward of the longitudinal center thereof and displaced upwardly from the bottom wall 22d of the container structure 20d by a predetermined displacement distance. This, of course, necessitates the similar upward displacement of the roller means 52d carried at the rear end of the mounting and supporting frame means 34d on the upright standard members 84. Otherwise, this modification of the invention is generally similar to the first form of the invention, and no further detailed description will be given since it is believed that such would be redundant in view of the full and detailed description of the similar portions of the first form of the invention as set forth hereinbefore.

For example, the rollable wheel means 50 and the frame means 34 taking the form of the pair of longitudinal, upwardly open, substantially U-shaped channel members 38 and cross frame members 40 may be modified to comprise virtually any type of track means and track follower means cooperable therewith. One form which such track and track follower means may assume would be a positionally reversed arrangement with one or more rollable wheel means being carried upon frame means 34 rather than by the container means 20 and with the container means 20 having a wheel-engaging edge extending downwardly into contact with the rollable wheel means. Engagement therebetween might be facilitated by effectively grooving the rollable wheel means carried by the frame means 34 to receive the wheel-engaging edge means in the groove thereof. Also, more than one wheel means may be employed in differently laterally placed relationship with respect to the longitudinal track means and may engage different portions thereof, either in the same general manner or in effectively reversed manners such as that described above, or both types of engagement may be employed in the same set of such wheel means. In other words, the type of track and track follower engagement may be modified very substantially within the broad scope of the present invention which is not limited to the specific type of track and track follower structure illustrated in the figures of the drawing.

Also, auxiliary support means may be employed for supporting the elevated front end of the container structure when it is in an inclined, gravity-load-discharging position such as that illustrated in FIGS. 6 and 7, for example. Said auxiliary support means would normally be positioned between either the bottom of the front container portion 20F and a lower portion of the pickup truck body 46 or between any other two vertically spaced portions thereof so as to act as a temporary support or prop adapted to be disengaged when the container structure 20 is to be returned to its rearwardly extended but horizontal position as shown in FIG. 4 prior to being moved forwardly into its normal load-receiving and load-carrying position such as shown in FIGS. 1-3 in solid lines and such as is shown in phantom in FIG. 4. A great variety of such different types of auxiliary front container portion supports or supporting structures may be employed within the broad scope of the present invention.

The rearward travel-limiting means, one form of which is generally designated by the reference numeral 57 in the first form of the invention, may be modified substantially within the broad scope of the present invention and may comprise any structure adapted to bring about the limitation of rearward travel at a desired preselected or predetermined point in the rearward travel of the container structure 20. All such substantially functionally equivalent structures are intended to be included and comprehended within the broad scope of the present invention.

Also, means may be provided for controllably locking and unlocking said rearward movement, travel-limiting means, either from a location adjacent to the rear of the pickup truck bed and the container structure or from a remote location forward thereof or adjacent to the pickup truck cab so that a driver of the vehicle can operate same from that remote location.

It should be understood that the figures and the specific description thereof set forth in this application are for the purpose of illustrating the present invention and are not to be construed as limiting the present invention to the precise and detailed specific structure shown in the figures and specifically described hereinbefore.

I claim:

1. Dumping apparatus for a vehicle comprising: a hollow chamber-defining container structure effectively defining a dump box taking the form of an auxiliary vehicle body portion having a rear load-discharging end and having a hollow interior load-carrying chamber defined within said container structure; a container mounting and supporting longitudinal frame means fixedly mounted in a substantially horizontally directed plane with respect to a vehicle body portion, said longitudinal frame means effectively comprising track means; rear end portions of said longitudinal frame means being provided with upwardly directed pivot roller means for rollable and pivoting cooperation with respect to corresponding roller-riding, load-supporting and effective pivoting portions of said container structure; at least a forward portion of said container structure being provided with track follower means adapted to movably cooperate with said track means for relative longitudinal movement of said container structure therealong from a forwardly extreme, normal, load-receiving and load-carrying position toward a rearwardly extreme, preload-dumping position where a rear portion of said container structure extends rearwardly beyond a rear end of said track means and said upwardly directed pivot roller means carried thereby and is unsupported thereby and provides a downwardly directed tipping movement to said rear portion of said container structure for automatically causing said rear load-discharging end thereof to arcuately pivotally move downwardly into a lower extreme gravity-load-discharging position for discharging a load previously carried within said container structure; said track follower means carried by a forward portion of said container structure comprising substantially downwardly directed rollable wheel means and said track means comprising said longitudinal frame means taking the form of wheel-receiving means normally receiving said downwardly directed rollable wheel means of said track follower means cooperating therewith for relative rollable movement therealong of said rollable wheel means and said container structure; and biasing return spring means having one end connected to an upwardly and forwardly offset connection portion of said container structure forwardly displaced from its horizontal axis of rotation during said downward tipping movement between said rearwardly extreme preload-dumping position and said lower extreme gravity-load-discharging position and vice versa, said biasing return spring means having an opposite end effectively connected with respect to the vehicle body portion at a location forwardly displaced from a rear end thereof, said biasing return spring means and said connections of opposite ends thereof being normally of a size, shape, and position such as to cause said biasing return spring means to be substantially untensioned until said container structure is moved into said rearwardly extreme preload-dumping position, after which any downward tipping movement thereof effectively tensions said biasing spring means to an extent such as to be adapted, after said container structure has discharged its load and is substantially unloaded, to forcibly return said container structure from said lower extreme, angularly inclined, gravity-load-discharging position into its upper normal substantially horizontal position preparatory to being rollably moved into its forwardly extreme normal load-receiving and load-carrying position.

2. Apparatus as defined in claim 1, wherein at least one of said track means and said track follower means is provided with substantially vertically directed rollable wheel means and the other one of said track and track follower means is provided with longitudinally directed wheel-receiving means adapted to receive said rollable wheel means for said relative longitudinal movement therealong.

3. Apparatus as defined in claim 1, wherein said track follower means carried by a forward portion of said container structure comprises substantially downwardly directed rollable wheel means and said track means comprising said longitudinal frame means takes the form of wheel-receiving means normally receiving said downwardly directed rollable wheel means of said track follower means and cooperating therewith for relative rollable movement therealong of said rollable wheel means and said container structure.

4. Apparatus as defined in claim 3, wherein said roller-riding, load-supporting portions comprise side edge bottom surface portions of said container structure extending therealong from the rear end thereof to a forward location just forward of the longitudinal center of the container structure.

5. Apparatus as defined in claim 3, including multiple-element effective stop means having at least one portion carried by the movable container structure and at least one other cooperating element carried by a rear end portion of said longitudinal frame means for forcible rearward travel limiting abutment with each other when said container structure is rearwardly moved relative to said longitudinal frame means into said rearward extreme preload dumping position.

6. Apparatus as defined in claim 3, including multiple-element effective stop means having at least one portion carried by the movable container structure and at least one other cooperating element carried by a rear end portion of said longitudinal frame means for forcible rearward travel limiting abutment with each other when said container structure is rearwardly moved relative to said longitudinal frame means into said rearward extreme preload dumping position, said multiple-element effective stop means comprising an abutment means carried by said container structure in an engageable position and a cooperable and engageable stop member carried adjacent to the rear end of said longitudinal frame means, with said abutment member being adapted to move into translatory-movement-stopping abutment with respect to said stop member when said container structure has been rearwardly moved into said rearwardly extreme, preload-dumping position.

7. Apparatus as defined in claim 3, including multiple-element effective stop means having at least one portion carried by the movable container structure and at least one other cooperating element carried by a rear end portion of said longitudinal frame means for forcible rearward travel-limiting abutment with each other when said container structure is rearwardly moved relative to said longitudinal frame means into said rearward extreme preload-dumping position, said multiple-element effective stop means comprising a curved abutment member carried by a bottom portion of said container structure in a downwardly extending position and a fixed upwardly accessible stop member carried adjacent to the rear end of said longitudinal frame means and comprising a transversely directed, cross frame member adapted to receive said downwardly extending curved abutment member thereagainst when said container structure has been rearwardly moved into said rearwardly extreme preload-dumping position.

8. Apparatus as defined in claim 6, wherein said abutment means is positioned forwardly of a transversely directed, vertical, longitudinal center plane of said container structure.

9. Apparatus as defined in claim 3, wherein said longitudinal frame means comprises a pair of longitudinal, substantially parallel, horizontally positioned, upwardly open, substantially U-shaped channel members adapted to receive said downwardly directed container-supporting rollable wheel means therewithin for captive rollable movement along similar lengths thereof.

10. Apparatus as defined in claim 3, wherein said roller-riding load-supporting portions comprise a pair of outwardly extending, downwardly facing, similar, effectively grooved roller-receiving channel portions carried by corresponding sidewall portions of said container structure and extending from the rear end thereof to a position just forward of the longitudinal center thereof.

11. Apparatus as defined in claim 3, wherein said roller-riding load-supporting portions comprise a pair of outwardly extending, downwardly facing, similar, effectively grooved roller-receiving channel portions carried by corresponding sidewall portions of said container structure and extending from the rear end thereof to a position just forward of the longitudinal center thereof and displaced upwardly from a bottom wall of said container structure by a predetermined displacement distance; said roller means carried at the rear end of said mounting and supporting frame means being upwardly displaced from said frame means by a distance corresponding to said displacement distance.

* * * * *